United States Patent [19]

Okamura

[11] Patent Number: 4,621,295

[45] Date of Patent: Nov. 4, 1986

[54] FLOPPY DISK DRIVE HAVING IMPROVED FRAME MEANS

[75] Inventor: Kazuhiko Okamura, Kanagawa, Japan

[73] Assignee: Tokyo Electric Co., Ltd., Tokyo, Japan

[21] Appl. No.: 554,297

[22] Filed: Nov. 24, 1983

[30] Foreign Application Priority Data

Nov. 26, 1982 [JP] Japan .................................. 57-208026

[51] Int. Cl.4 ............................................. G11B 5/016
[52] U.S. Cl. ....................................................... 360/99
[58] Field of Search ............................. 360/97, 98, 99; 206/444

[56] References Cited

U.S. PATENT DOCUMENTS 4,193,102 5/1980 Bench et al. ........................... 360/99
4,380,782 4/1983 Hirose et al. .......................... 360/99

Primary Examiner—Robert S. Tupper
Assistant Examiner—Melissa J. Koval
Attorney, Agent, or Firm—Oblon, Fisher, Spivak, McClelland & Maier

[57] ABSTRACT

A floppy disk drive in which a frame, disposed in opposition to a base to define a path for a magnetic medium therebetween, is formed of a plate material which is suitably bent so as to facilitate mounting of a clamp and a clamp arm thereon while maintaining its function to guide a magnetic medium.

4 Claims, 6 Drawing Figures

F I G. 5
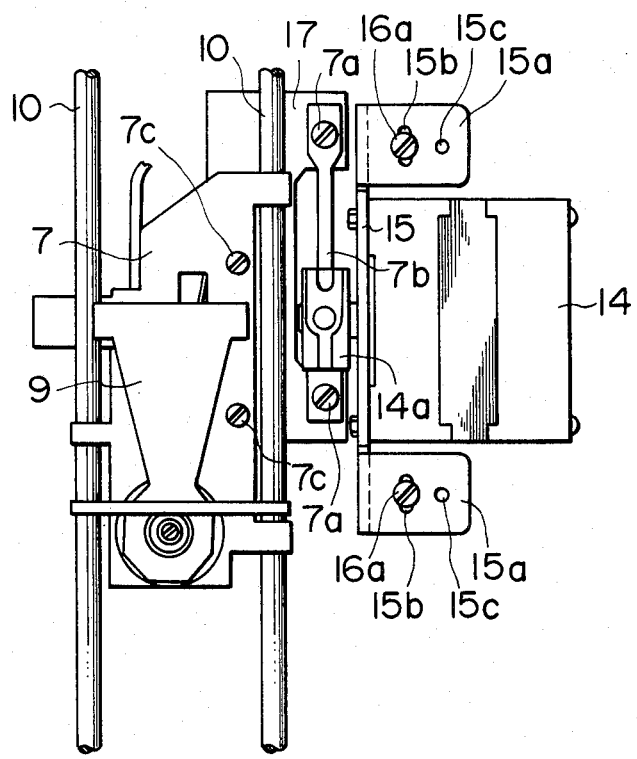

4,621,295

FLOPPY DISK DRIVE HAVING IMPROVED FRAME MEANS

BACKGROUND OF THE INVENTION

1. Field of the Invention

This invention relates to a floppy disk drive wherein a magnetic head magnetically writes onto and reads from tracks formed on a rotating magnetic medium.

2. Discussion of the Background

Generally, a floppy disk drive has such a construction that a magnetic medium is rotated by means of a spindle and a magnetic head is moved in a direction perpendicular to tracks formed on the magnetic medium. Since a magnetic medium is thus loaded into and removed from the floppy disk drive, the latter is required to have a guide means for guiding a magnetic medium. The floppy disk drive is further required to have a clamp for engaging a loaded magnetic medium with a spindle, a clamp arm for moving the clamp, an operating shaft for operating the clamp arm, and so on. Conventional floppy disk drives, however, have a guide for a magnetic medium, a support member for supporting an operating shaft, another support member for supporting a clamp arm, a further support member for supporting a clamp, and so on, which are provided independently of each other. As a result, adjustment of individual components or parts must be involved in operations for assembling a floppy disk drive. Besides, a floppy disk drive must be assembled with a great number of parts.

Accordingly, it is an object of the current invention to provide a floppy disk drive which has a reduced number of parts and is easy to assemble.

A more complete appreciation of the invention and many of the attendant advantages thereof will be readily obtained as the same becomes better understood by reference to the following detailed description when considered in connection with the accompanying drawings, wherein:

DESCRIPTION OF THE DRAWINGS

FIG. 5 is a plan view of a carrier; and

DESCRIPTION OF THE PREFERRED EMBODIMENT

Figure 1:
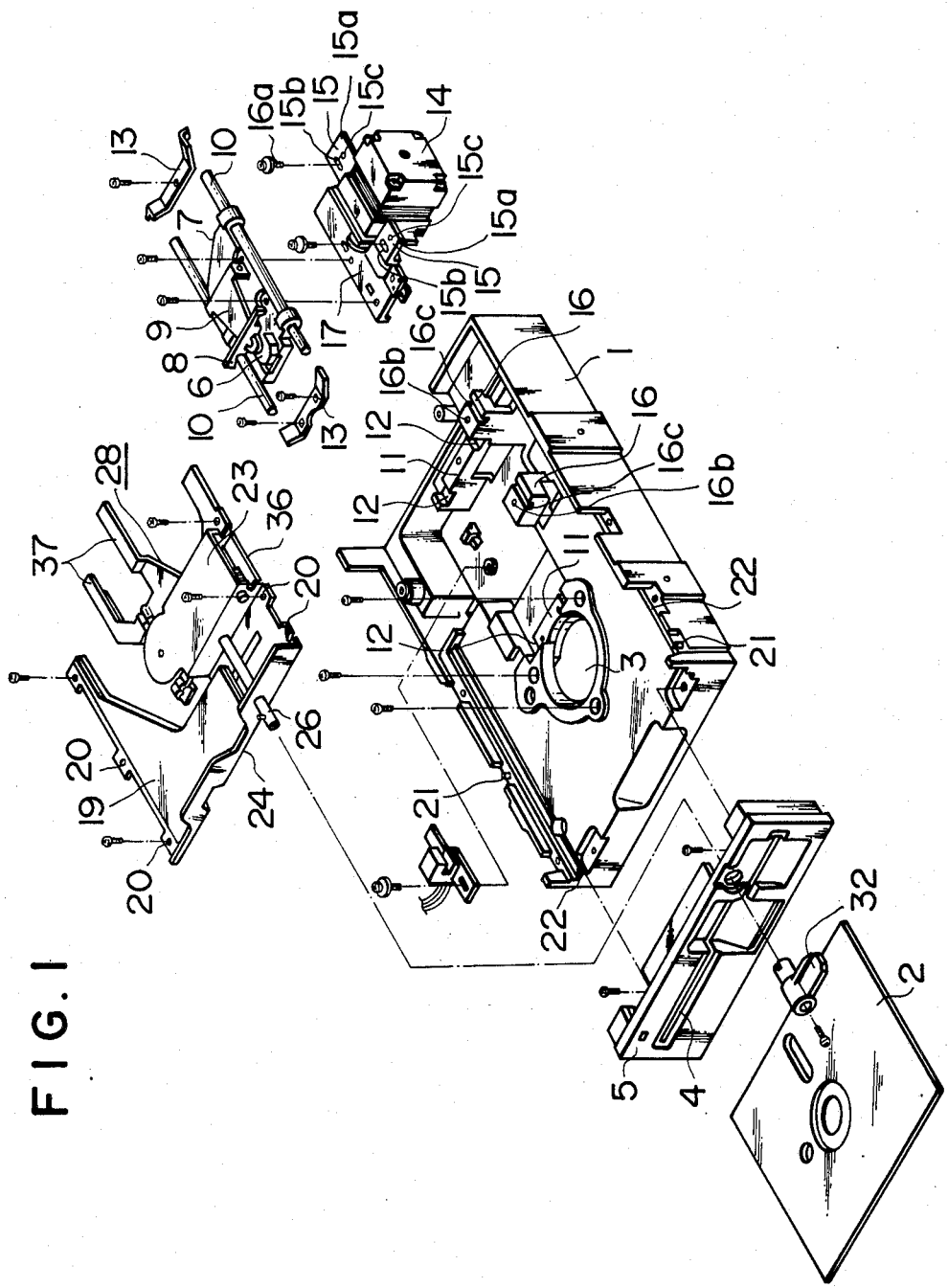
FIG. 1 is a fragmentary perspective view, in a reduced scale, showing an embodiment of a floppy disk drive of the present invention.
Figure 2:
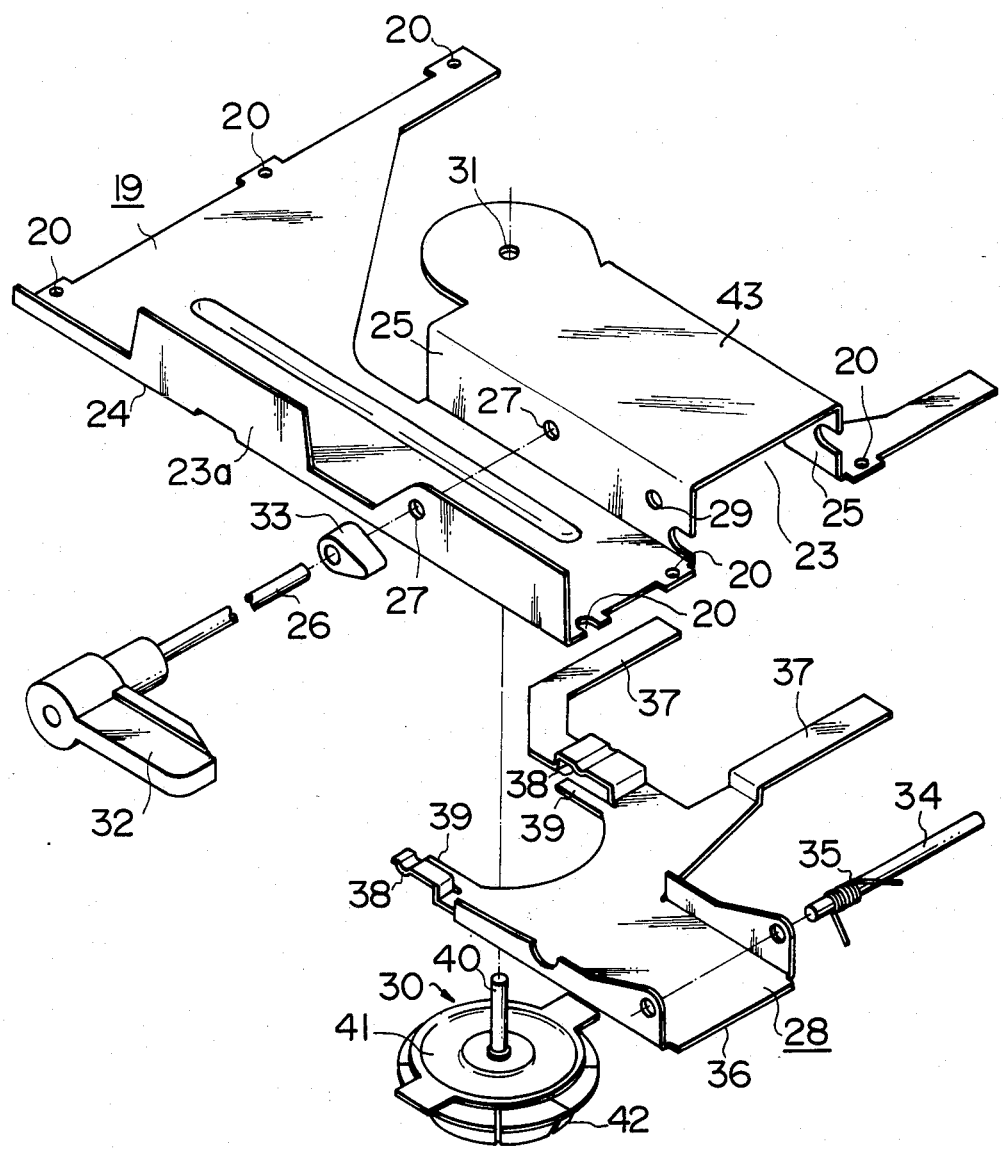
FIG. 2 is a fragmentary perspective view showing a portion of the floppy disk drive of FIG. 1.
Figure 3:
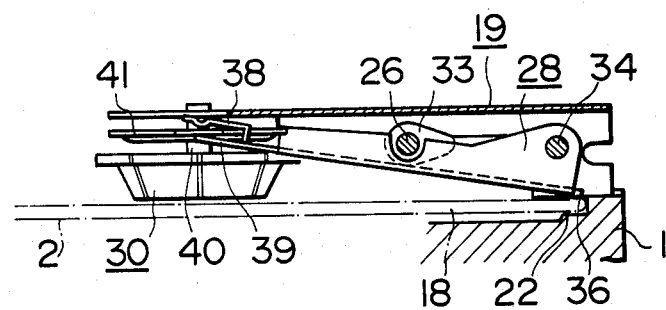
FIG. 3 is a vertical sectional view of another portion of the floppy disk drive of FIG. 1.
Figure 4:
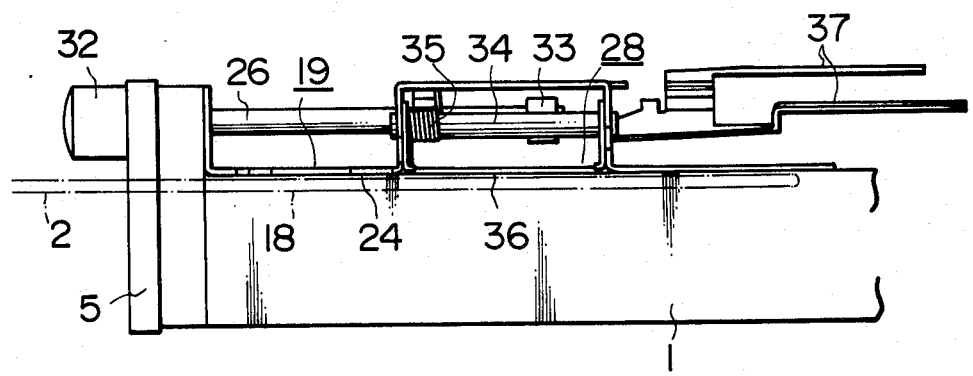
FIG. 4 is a side elevational view of the floppy disk drive of FIG. 1.
Figure 6:
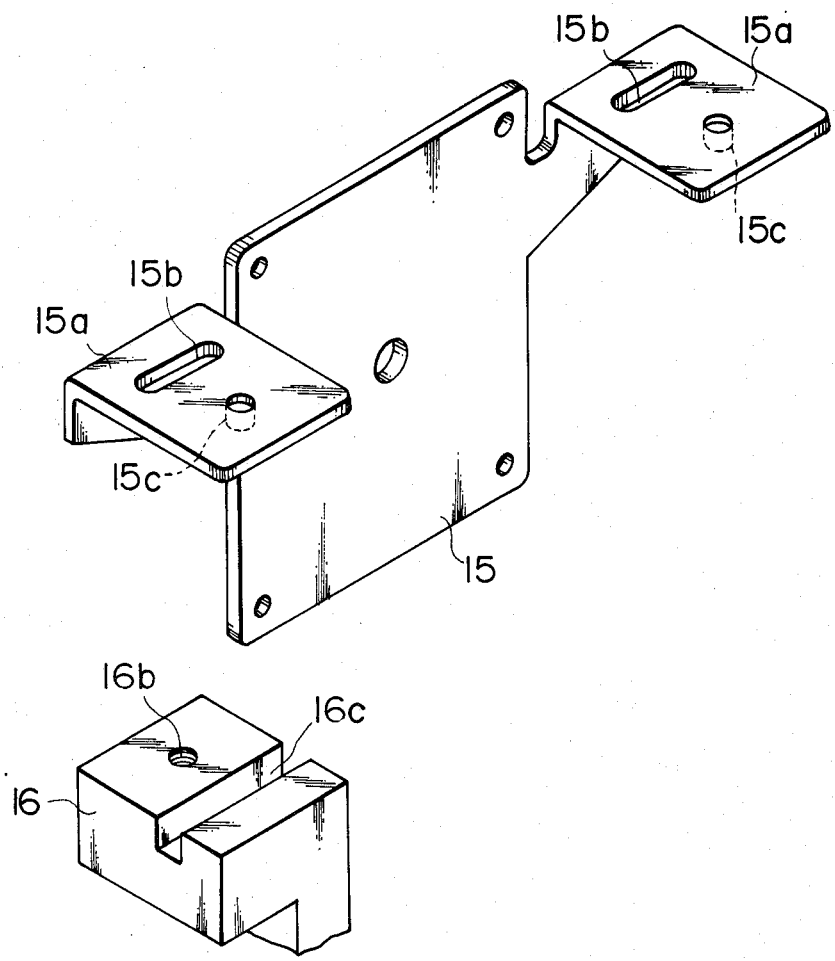
FIG. 6 is a partial perspective view, in an enlarged scale, showing a relation between a mounting plate and a motor mount of the assembly.

A more complete appreciation of the invention and many of the attendant advantages thereof will be readily obtained as the same becomes better understood by reference to the following detailed description when considered in connection with the accompanying drawings, wherein: floppy disk drive includes a base 1 on which is mounted a spindle motor (not shown) for providing a rotational force to a magnetic medium 2 via a spindle (not shown). An opening 3 is formed at the center of the base 1 for allowing the spindle to extend therethrough. A front panel 5 having a slit 4 formed therein to allow the magnetic medium 2 to be loaded into the floppy disk drive is screwed onto a front face of the base 1. A head load arm 9 having a transverse extension 8 thereon is mounted for pivotal motion and urged in a downward direction on a carrier 7 which has a magnetic head 6 carried thereon. The carrier 7 is supported for sliding motion on a pair of guide rods 10 which are fitted at opposite ends thereof in grooves 12 formed on mounts 11 of the base 1 and are fixed thereto by means of spring plates 13 screwed onto the mounts 11. A mounting plate 15 for mounting a stepping motor 14 thereon is screwed onto mounts 16 formed on the base 1. Each of the mounts 16 has formed thereon a threaded hole 16b in which a screw 16a is screwed and a groove 16c. The grooves 16c of the mounts 16 of the base 1 are formed or worked simultaneously with the same machine when the recesses 12 are worked. Meanwhile, the mounting plate 15 has a pair of projections 15a which each have an elongated mounting hole 15b formed therein and a dowel 15c formed thereon, the mounting holes 15b and the dowels 15c being worked in the same step by a same punch. The stepping motor 14 may be of a conventional type and has a pulley 14a directly secured thereto. A steel belt 7b is wound around the pulley 14 and is fastened by means of screws 7a to a slider 17 which is screwed onto the carrier 7 by means of screws 7c. Thus, by this arrangement, a driving force of the stepping motor 14 is transmitted to the carrier 7.

A frame 19 formed of a plate member or material is disposed in opposition to the base 1 to define a path 18 for a magnetic medium 2 therebetween. The frame 19 has a plurality of mounting holes 20 formed along opposite sides thereof while pins 21 are formed to uprightly extend from opposite sides of the base 1 in corresponding relationship to some of the mounting holes 20 of the frame 19. The frame 19 is thus mounted in position on the base 1 with the pins 21 of the latter fitted in some of the mounting holes 20 and is secured thereto by means of screws which are fitted in the remaining ones of the mounting holes 20. The base 1 further has a pair of stepped guide faces 22 formed on portions of a bottom surface along opposite sides thereof for guiding sliding motion of the magnetic medium 2.

The frame 19 is suitably bent to define a channel-like accommodating recess 23 which is open at a face thereof. The frame 19 further has a guide face 24 formed on a surface thereof opposed to the base 1 and, except for the accommodating recess 23, serves to guide the top surface of the magnetic medium 2. A shaft hole 27 is formed in each of opposite side walls 25 of the accommodating recess 23 and also in a forward wall 23a formed by bending a front edge of frame 19, and an operating shaft 26 is mounted for rotation in the shaft holes 27 in the frame 19. Another shaft hole 29 is formed in each of the side walls 25 of the accommodating recess 23 and mounts a clamp arm 28 for rotation therein. A further shaft hole 31 is formed in an upper wall 43 of the accommodating recess 23 and mounts a clamp 30 for rotation and for axial sliding motion therein.

The operating shaft 26 is supported for pivotal motion also relative to the front panel 5 and has a knob 32 secured at one end thereof while a cam 33 for pressing upon the clamp arm 28 is secured to the opposite end thereof.

A pivot 34 for the clamp arm 28 is supported in the shaft holes 29 and a torsion spring 35 is coiled around the pivot 34 to urge the clamp arm 28 in an upward direction. The clamp arm 28 has formed thereon a guide edge 36 located at an end thereof adjacent the fulcrum of the pivotal motion, projections 37 for supporting the extension 8 of the head load arm 9, pressure faces 38, and receiving faces 39 opposed to the pressure faces 38. The guide edge 36 of the clamp arm 28 in its free condition is positioned in the same plane with the guide face 24 to guide the magnetic medium 2.

The clamp 30 includes a plate member 41 mounted for axial sliding motion along a pivot 40 supported in the shaft hole 31 of the frame 19, and a rotary member 42 mounted on the pivot 40 for rotation and for axial sliding motion in integral relationship with the plate member 41. Opposite ends of the plate member 41 are inserted between the pressure faces 38 and the opposing receiving faces 39 of the frame 19.

In this construction, the knob 32 is brought to a horizontal position and a magnetic medium 2 is inserted into the path 18 under the guidance of the guide faces 22 and 24. Although the guide face 24 terminates intermediately at one side thereof because of the existence of the accommodating recess 23, an edge of the clamp arm 28 acts, when in an upwardly pivoted position, as the guide edge 36, thereby preventing the magnetic medium 2 from being caught at a front edge thereof by the side wall 25 of the accommodating recess 23. The head load arm 9 which is urged downwardly by downward movement of the clamp arm 28 is released from the projection 37 of the clamp arm 28 to press the magnetic medium 2 against the magnetic head 6.

Then, the knob 32 is pivoted in a clockwise direction to push down the clamp arm 28 by operation of the cam 33 thereon, thereby to press down the clamp 30 by means of the pressure faces 38 of the clamp arm 28. As a result, the magnetic medium 2 is clamped by and between the spindle and the clamp 30 so that rotation of the spindle motor is imparted to the magnetic medium 2 from the spindle while the stepping motor 14 may be energized to slidably move the carrier 7, thereby effecting writing or reading of data onto or from the magnetic medium 2.

After completion of data processing, the knob 32 is pivoted back to the horizontal position. By this pivotal motion, the clamp arm 28 is released from the cam 33 and is returned to its initial position while the projections 37 thereof engage with the head load arm 9 to raise the head load arm 9. The receiving faces 39 of clamp arm 28 also engage the clamp 30 to disengage the clamp 30 from the magnetic medium 2. In this position, the magnetic medium 2 may be withdrawn from the floppy disk drive in a similar manner under the guidance of the guide faces 22 and 24 and the guide edge 36.

In this way, in the floppy disk drive, the guide face 24 is formed on one surface of the frame 19 and the guide edge 36 is integrally formed along a side of the clamp arm 28 while the operating shaft 26, the clamp arm 28 and the clamp 30 are mounted on a common support member provided by the frame 19. This arrangement thus allows reduction of the number of parts, resulting in simplification of assembling operations and reduction of the production cost.

Obviously, numerous modifications and variations of the present invention are possible in light of the above teachings. It is therefore to be understood that within the scope of the appended claims, the invention may be practiced otherwise than as specifically described herein.

What is claimed is:

1. A floppy disk drive having a path extending longitudinally from the front thereof for the insertion and removal of a magnetic medium and comprising:

a base;

a spindle rotatable about a spindle axis;

a magnetic head carried by a carrier, said carrier being mounted for reciprocal motion across tracks on the magnetic medium;

a frame having a substantially planar guide face opposed to said base for guiding the magnetic medium during insertion and removal thereof, said frame further comprising a forward wall extending transversely and perpendicular to said guide face at a forward edge of said frame, said frame further comprising a channel-like accommodating recess formed by an upper wall spaced from the plane of said guide face and first and second side walls extending between said guide face and said upper wall;

a clamp for pressing the center of the magnetic medium against said spindle, means mounting said clamp for rotation and for axial sliding motion within said accommodating recess;

said mounting means including a clamp arm mounted for pivotal motion between an operative and inoperative position within said accommodating recess of said frame and comprising means for pressing said clamp agagainst the magnetic medium in the operative position, said clamp arm further including a guide edge substantially coplanar with said guide face for further guiding of said magnetic medium during insertion and removal thereof in the inoperative position and means for moving said clamp arm, comprising an operating shaft supported on said forward wall of said frame and on said first and second side walls of said accommodating recess, and a cam mounted on said operating shaft for contacting and moving said clamp arm between said positions.

2. A floppy disk drive according to claim 1, wherein said clamp arm nests within said accommodating recess closely adjacent said first and second side walls thereof.

3. A floppy disk drive according to claim 1, wherein said frame is formed of a plate material.

4. A floppy disk drive according to claim 5, wherein said clamp arm is formed of a plate material.

* * * * *